(12) United States Patent
Etesami et al.

(10) Patent No.: US 12,637,102 B2
(45) Date of Patent: May 26, 2026

(54) DYNAMICS-DEPENDENT BEHAVIORAL PLANNING FOR AT LEAST PARTIALLY SELF-DRIVING VEHICLES

(71) Applicant: Robert Bosch GmbH, Stuttgart (DE)

(72) Inventors: Seyed Jalal Etesami, Lausanne (CH); Martin Stoll, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 289 days.

(21) Appl. No.: 18/252,457

(22) PCT Filed: Nov. 30, 2021

(86) PCT No.: PCT/EP2021/083643
§ 371 (c)(1),
(2) Date: May 10, 2023

(87) PCT Pub. No.: WO2022/117588
PCT Pub. Date: Jun. 9, 2022

(65) Prior Publication Data
US 2024/0001955 A1     Jan. 4, 2024

(30) Foreign Application Priority Data
Dec. 3, 2020    (DE) ..................... 10 2020 215 302.7

(51) Int. Cl.
*B60W 60/00* (2020.01)
*B60W 30/09* (2012.01)
(Continued)

(52) U.S. Cl.
CPC .......... *B60W 60/001* (2020.02); *B60W 30/09* (2013.01); *B60W 30/18163* (2013.01); *G06N 3/08* (2013.01); *B60W 2050/0018* (2013.01)

(58) Field of Classification Search
CPC .............. B60W 60/001; B60W 30/09; B60W 30/18163; B60W 2050/0018;
(Continued)

(56) References Cited

U.S. PATENT DOCUMENTS 9,443,153 B1 * 9/2016 Gupta ....................... G07C 5/08
10,032,111 B1 * 7/2018 Bertram ................... G09B 9/16
(Continued)

FOREIGN PATENT DOCUMENTS

DE    10 2018 217 004 A1    4/2019
DE    10 2018 210 280 A1    1/2020
(Continued)

OTHER PUBLICATIONS

EP-3104284-A1 machine translation (Year: 2016).*
(Continued)

*Primary Examiner* — Angelina M Shudy
(74) *Attorney, Agent, or Firm* — Maginot, Moore & Beck LLP

(57) ABSTRACT
A method for training a behavior planner for an at least partially self-driving target vehicle on the basis of observation data regarding kinematics and/or dynamics that have been recorded during at least one test drive in a test vehicle includes identifying a driving maneuver that moves the test vehicle from an initial state to an end state using the observation data, ascertaining the maneuver end time, retrieving a maneuver duration required by the target vehicle to perform the identified driving maneuver from a dynamics model of the target vehicle, labeling observation data from a time interval, defined by the maneuver duration, with the identified driving maneuver, and training the behavior planner, using the labeled observation data, to map observation data that indicate a state of the target vehicle to at least one driving maneuver to be performed.

7 Claims, 3 Drawing Sheets

(51) Int. Cl.
  *B60W 30/18* (2012.01)
  *G06N 3/08* (2023.01)
  *B60W 50/00* (2006.01)
(58) Field of Classification Search
  CPC ......... B60W 2050/0083; B60W 30/16; B60W
    50/0098; B60W 2050/0028; G06N 3/08;
    G05D 1/00; G08G 1/00; G01C 21/00
  See application file for complete search history.

(56) References Cited

U.S. PATENT DOCUMENTS

| | | | | |
|---|---|---|---|---|
| 10,503,172 | B2 * | 12/2019 | Englard | G05D 1/0088 |
| 10,776,542 | B2 * | 9/2020 | Kim | B60W 60/00 |
| 11,351,995 | B2 * | 6/2022 | Bagschik | B60W 30/0956 |
| 11,481,629 | B2 * | 10/2022 | Budden | G06N 3/08 |
| 11,485,014 | B1 * | 11/2022 | Reynders, III | B25J 9/163 |
| 11,577,750 | B2 * | 2/2023 | Nagaraja | B60W 50/0098 |
| 11,590,969 | B1 * | 2/2023 | Crego | G06N 3/09 |
| 11,738,463 | B2 * | 8/2023 | Straehle | B25J 9/1694 |
| | | | | 700/253 |
| 11,810,225 | B2 * | 11/2023 | Bagschik | G06N 3/094 |
| 11,815,897 | B2 * | 11/2023 | Nabatchian | G05D 1/0221 |
| 11,891,088 | B1 * | 2/2024 | Kobilarov | G07C 5/0808 |
| 12,077,180 | B2 * | 9/2024 | Lienke | B60W 60/001 |
| 12,099,922 | B2 * | 9/2024 | Zhao | G06N 3/08 |
| 12,244,973 | B1 * | 3/2025 | Gorfajn | G06V 40/10 |
| 12,260,302 | B2 * | 3/2025 | Geiger | G06N 20/00 |
| 12,269,462 | B1 * | 4/2025 | Garimella | B62D 15/0285 |
| 12,377,869 | B1 * | 8/2025 | Sanchez | G07C 5/02 |
| 12,399,798 | B2 * | 8/2025 | Donderici | G06N 3/10 |
| 12,448,001 | B2 * | 10/2025 | Bagnell | B60W 50/0097 |
| 2015/0127149 | A1 * | 5/2015 | Sinyavskiy | G06N 3/008 |
| | | | | 700/250 |
| 2016/0225261 | A1 * | 8/2016 | Matsumoto | G08G 1/167 |
| 2017/0174221 | A1 * | 6/2017 | Vaughn | G05D 1/0221 |
| 2018/0275667 | A1 * | 9/2018 | Liu | G01C 21/26 |
| 2018/0319403 | A1 * | 11/2018 | Buburuzan | B60W 30/18163 |
| 2019/0004525 | A1 * | 1/2019 | Bills | G05D 1/0278 |
| 2019/0113927 | A1 * | 4/2019 | Englard | G06F 16/285 |
| 2019/0118806 | A1 * | 4/2019 | Augst | B60W 30/18163 |
| 2019/0161080 | A1 * | 5/2019 | Gochev | G08G 1/165 |
| 2019/0196464 | A1 * | 6/2019 | Lockwood | G05D 1/0022 |
| 2019/0225223 | A1 * | 7/2019 | Feron | B60W 50/08 |
| 2019/0329779 | A1 | 10/2019 | D'sa et al. | |
| 2019/0346844 | A1 * | 11/2019 | Chen | G05B 13/0265 |
| 2020/0039520 | A1 * | 2/2020 | Misu | B60W 40/09 |
| 2020/0074862 | A1 * | 3/2020 | Johnston | G08G 1/22 |
| 2020/0164745 | A1 * | 5/2020 | Mohan | F02D 29/02 |
| 2020/0202117 | A1 * | 6/2020 | Wu | G06F 21/32 |
| 2020/0249683 | A1 * | 8/2020 | Rosales | G05D 1/617 |
| 2020/0285244 | A1 * | 9/2020 | Gier | G05D 1/0246 |
| 2020/0290619 | A1 * | 9/2020 | Mehdi | B60W 40/04 |
| 2020/0301434 | A1 * | 9/2020 | Manna | G05D 1/0214 |
| 2020/0380354 | A1 * | 12/2020 | Zhao | G06N 3/049 |
| 2021/0046924 | A1 * | 2/2021 | Caldwell | B60W 30/09 |
| 2021/0070320 | A1 * | 3/2021 | Nagaraja | B60W 50/0098 |
| 2021/0094540 | A1 * | 4/2021 | Bagschik | G06V 20/58 |

| | | | | |
|---|---|---|---|---|
| 2021/0101619 | A1 * | 4/2021 | Weast | G06F 16/2457 |
| 2021/0114604 | A1 * | 4/2021 | Nagaraja | G06N 3/044 |
| 2021/0129863 | A1 * | 5/2021 | Nattermann | G01C 21/3658 |
| 2021/0179124 | A1 * | 6/2021 | Hollander | G06F 11/3684 |
| 2021/0188316 | A1 * | 6/2021 | Marchetti-Bowick | |
| | | | | B60W 60/0011 |
| 2021/0269065 | A1 * | 9/2021 | Haggblade | B60W 30/18154 |
| 2021/0294944 | A1 * | 9/2021 | Nassar | G05D 1/0088 |
| 2021/0370980 | A1 * | 12/2021 | Ramamoorthy | H02J 3/14 |
| 2021/0403045 | A1 * | 12/2021 | Lin | G01C 21/3453 |
| 2022/0080961 | A1 * | 3/2022 | Lienke | B60W 50/0097 |
| 2022/0108139 | A1 * | 4/2022 | Tolstov | G06V 20/40 |
| 2022/0119004 | A1 * | 4/2022 | Avadhanam | G06N 20/00 |
| 2022/0138568 | A1 * | 5/2022 | Smolyanskiy | G06N 3/0442 |
| | | | | 706/21 |
| 2022/0153298 | A1 * | 5/2022 | Wang | G06N 3/08 |
| 2022/0297726 | A1 * | 9/2022 | Zhang | G01C 21/3453 |
| 2022/0306156 | A1 * | 9/2022 | Wray | G06V 20/588 |
| 2022/0365539 | A1 * | 11/2022 | Molinari | B60W 60/001 |
| 2023/0001940 | A1 * | 1/2023 | Doerr | G06N 3/094 |
| 2023/0008285 | A1 * | 1/2023 | Ma | G06F 16/9027 |
| 2023/0139551 | A1 * | 5/2023 | Zhao | B60W 30/18163 |
| | | | | 701/26 |
| 2023/0152813 | A1 * | 5/2023 | Joseph | G05D 1/617 |
| | | | | 701/2 |
| 2023/0195107 | A1 * | 6/2023 | Winter | G06V 20/70 |
| | | | | 701/2 |
| 2023/0202522 | A1 * | 6/2023 | Cui | B60W 60/0015 |
| | | | | 701/24 |
| 2023/0322234 | A1 * | 10/2023 | Wang | B60W 30/12 |
| 2024/0001926 | A1 * | 1/2024 | Singh | B60W 30/16 |
| 2024/0010236 | A1 * | 1/2024 | Schmitt | B60W 60/0015 |
| 2024/0028903 | A1 * | 1/2024 | Ancora | G06N 3/084 |
| 2024/0190418 | A1 * | 6/2024 | Strunck | G08G 1/166 |
| 2024/0255297 | A1 * | 8/2024 | Hallgarten | G01C 21/3492 |
| 2024/0383497 | A1 * | 11/2024 | Desies | B60W 60/001 |
| 2024/0425081 | A1 * | 12/2024 | Stoll | G06N 3/08 |
| 2025/0077741 | A1 * | 3/2025 | Nogales Iturri | B60W 60/001 |
| 2025/0124812 | A1 * | 4/2025 | Dos Reis Costa | B60W 50/14 |
| 2025/0162612 | A1 * | 5/2025 | Woelki | B60W 60/00274 |
| 2025/0171048 | A1 * | 5/2025 | Sathy | G08G 1/096791 |
| 2025/0206354 | A1 * | 6/2025 | Weast | B60W 30/095 |
| 2025/0214608 | A1 * | 7/2025 | Dang | G06N 20/00 |
| 2025/0256704 | A1 * | 8/2025 | Min | B60W 30/12 |
| 2025/0326398 | A1 * | 10/2025 | Morriello | B60W 30/18163 |

FOREIGN PATENT DOCUMENTS

| | | | | |
|---|---|---|---|---|
| DE | 10 2019 206 052 A1 | 10/2020 | | |
| EP | 3104284 A1 * | 12/2016 | | B60W 30/0956 |
| EP | 3 690 750 A1 | 8/2020 | | |
| WO | 2019/081778 A1 | 5/2019 | | |

OTHER PUBLICATIONS

International Search Report corresponding to PCT Application No. PCT/EP2021/083643, mailed Mar. 16, 2022 (German and English language document) (6 pages).

* cited by examiner

DYNAMICS-DEPENDENT BEHAVIORAL PLANNING FOR AT LEAST PARTIALLY SELF-DRIVING VEHICLES

This application is a 35 U.S.C. § 371 National Stage Application of PCT/EP2021/083643, filed on Nov. 30, 2021, which claims the benefit of priority to Serial No. DE 10 2020 215 302.7, filed on Dec. 3, 2020 in Germany, the disclosures of which are incorporated herein by reference in their entirety.

The present disclosure relates to the planning of driving maneuvers for at least partially self-driving vehicles.

BACKGROUND

An at least partially self-driving vehicle continually acquires the situation it is in, in order to adapt the planning of driving maneuvers in the near future to changes in this situation. Changes in the situation to which the vehicle has to react can, for example, be caused by the vehicle moving to a different location with different conditions. Movements of other objects, such as other road users, can change the situation significantly too, and require a reaction. DE 10 2018 210 280 A1 discloses a method with which the trajectories of extraneous objects can be predicted, so that the trajectory of one's own vehicle can be adjusted accordingly.

At the maneuver level, a behavior planner makes the decision to carry out a driving maneuver, such as a lane change or a passing maneuver, based on a representation of the situation the vehicle is in. The made decision is then passed on to a motion planner. The task of this motion planner is to find a suitable trajectory for the vehicle and causing the vehicle to follow this trajectory by acting on actuators.

SUMMARY

Within the scope of the disclosure, a method for training a behavior planner for an at least partially automated vehicle was developed. This method uses observation data relating to the kinematics and/or dynamics that have been recorded during at least one test drive in a test vehicle.

To distinguish this test vehicle, the at least partially automated vehicle is hereinafter referred to as the "target vehicle". Test drives are typically carried out under the control of a human driver. The test vehicle has to then be a vehicle designed to be controlled by a human driver. Fully automated vehicles in particular are usually not designed to selectively be controlled automatically or by a human driver.

From the observation data, at least one driving maneuver that moves the test vehicle from an initial state to an end state is identified. The maneuver end time at which the test vehicle reaches the end state is determined as well. Any existing means can be used for this purpose.

A maneuver duration required by the target vehicle to perform the identified driving maneuver is retrieved from a dynamics model of the target vehicle. The dynamics model thus in particular embodies the driving physics of the target vehicle, which determines how quickly the target vehicle can change its kinematics in response to a corresponding requirement.

Observation data from a time interval, the end of which is defined by the maneuver end time and the start of which is before the maneuver end time by the maneuver duration, are labeled with the identified driving maneuver. This means that, if the target vehicle is to reach the end state specified by the observation data with the identified driving maneuver by the determined maneuver end time, the target vehicle has to carry out the identified driving maneuver within this time interval.

The behavior planner is trained, using the labeled observation data, to map observation data indicating a state of the target vehicle to at least one driving maneuver to be carried out. This state of the target vehicle does not have to be limited to information about the kinematics and/or dynamics of the target vehicle, but can also include further information about the situation the target vehicle is in.

For example, the observation data can indicate that the test vehicle is approaching another, slower preceding vehicle from behind. At a certain point in time, the driver of the test vehicle changed lanes in order to pass the preceding vehicle. The behavior planner is now trained to start the passing maneuver in the same situation at the time when this is necessary or appropriate based on the driving physics of the target vehicle.

It has been found that the dynamics of the target vehicle usually differ significantly from the dynamics of the test vehicle. The reason for this, among other things, is that automated vehicles are constructed differently than test vehicles driven by human drivers. Automated driving mode is moreover, in many respects, subject to special regulatory requirements. Acceleration and deceleration, for example, are limited in terms of magnitude, and lane changes, too, have to be carried out more slowly than a human driver would. By using the dynamics model, the observation data collected with the test vehicle can be "translated" to the conditions of the target vehicle. The behavior planner can thus be trained to achieve the desired result, namely to have completed a specific driving maneuver at the given maneuver end time, under these new conditions.

The dynamics model also removes a subjective component caused by the personal driving style of the human tester from the test drives. Such driving styles differ primarily in the dynamics with which, for example, a passing procedure is carried out. The mere path followed by the test vehicle, on the other hand, is more or less predetermined and can only be changed to a small extent by the individual driving style.

With the help of the dynamics model, the behavior planner can moreover be further trained or retrained if the driving physics of the target vehicle subsequently change. For example, if a trailer is attached to the target vehicle, both the mass inertia and the air resistance of the target vehicle change. Abrupt changes of direction, too, are subject to additional restrictions, so that the trailer does not disconnect or tip over. All that is required to adapt the behavior planner to driving with a trailer is a new dynamics model. With this dynamics model and the already existing observation data, the behavior planner can be trained accordingly. There is no need to "drive in" additional observation data using a test vehicle with a trailer.

Such further training or retraining can also become necessary during the development of an automated target vehicle, for example. If the automated driving function on the one hand and the vehicle body on the other hand are developed in parallel, for example, structural changes to the vehicle may still be necessary at a time when the automated driving function is already largely trained. If the target vehicle is powered by battery electricity, for example, it may be desirable to provide a slightly modified vehicle model in which a second drive battery provides a significantly greater range. This second drive battery adds significant weight to the target vehicle at a specific location. This weight changes the mass inertia and also the moments of inertia of the target vehicle. This could potentially also shift the center of gravity of the target vehicle. Such changes affect the driving physics of the target vehicle.

Lastly, it also makes it easier to train the behavior planner for specific adverse weather conditions, such as extreme icy conditions. Such conditions are comparatively rare, so it would be difficult to repeat a comprehensive amount of test drives under these conditions. A new dynamics model for these conditions, with which the existing observation data can then be "translated", on the other hand, can be obtained with significantly fewer test drives.

The here-described automated labeling is also advantageous even when the dynamics of the target vehicle are identical to the dynamics of the test vehicle, but a planned behavior is basically implemented with latencies. Thus, for example, the behavior planned on the basis of surroundings data from time t can be communicated to the actuators with a delay a, i.e. not until a time t+a. A further delay b can then occur, so that the planned behavior does not become visible in the actually traveled trajectory until a time t+a+b. The approximation often used in the literature that the behavior or maneuver can be derived from directly successive observations and labeled correctly is then no longer valid.

In a particularly advantageous configuration, the driving maneuver is identified using a trained classifier model. This classifier model maps a time series of observation data to at least one driving maneuver that is consistent with that time series. Such classifier models are substantially independent of the circumstances of specific vehicles, because the carried-out driving maneuver is primarily defined by pure kinematics. The classifier model can be a machine learning model, for example. However, this is not absolutely necessary.

In a further advantageous configuration, a dynamics model of the target vehicle is selected, which is configured to map a combination of an initial state of the target vehicle and a specification of a driving maneuver to a maneuver duration. Many driving maneuvers can be started from many initial states, wherein the required maneuver duration depends on the initial state. A change in speed from 100 km/h to 200 km/h takes longer than the initial acceleration from 0 km/h to 100 km/h, for instance, because three times more kinetic energy is added to the initial kinetic energy input and the air resistance also increases quadratically with speed.

The combination mapped by the dynamics model to the maneuver duration can furthermore also include at least one adjustable parameter of the behavior planner of the target vehicle. A behavior planner for a battery electric vehicle, for example, can have a sport mode with zippy acceleration and maximum speed and an eco mode with more leisurely acceleration and speed, but greater range. Each individual driving maneuver can moreover also be self-parameterized.

At least one driving maneuver can, for example, include a lane change to an adjacent travel lane; and/or a change in the driving speed by a specified amount; and/or stopping the vehicle at a defined location; and/or driving behind another vehicle; and/or emergency braking of the vehicle.

The change in driving speed or emergency braking, for example, can be parameterized with the respective maximum possible acceleration or deceleration. Driving behind another vehicle, for example, can be parameterized with a target time or space distance to the other vehicle.

The training of the behavior planner ultimately pursues the objective that, in as many different situations as possible, the at least partially automated vehicle exhibits the behavior that is appropriate to the given situation and is not excessively surprising to the other traffic. The disclosure therefore also relates to a method comprising the complete chain of action all the way to the control of the vehicle.

This method starts by training a behavior planner for the at least partially automated vehicle using the above-described method. Observation data relating to the kinematics and/or dynamics of the vehicle are then acquired by means of at least one sensor of the vehicle. The observation data can additionally also include information from the surroundings of the vehicle and/or information retrieved from a digital map based on the current position of the vehicle, for example. Many driving maneuvers are therefore only possible if the traffic situation allows it and the part of the traffic space into which the vehicle is intended to drive is unoccupied, for example.

The observation data are mapped by means of the behavior planner to at least one driving maneuver to be carried out. At least one actuator acting on the driving dynamics of the vehicle is then controlled such that the vehicle carries out the driving maneuver.

The disclosure also relates to another method for training a dynamics model of a target vehicle for use in training a behavior planner.

The dynamics model is in particular understood to be a machine learning model. A machine learning model embodies a function parameterized with adjustable parameters with great power to generalize. When training a machine learning model, the parameters can in particular be adjusted in such a way that, when learning inputs are entered into the model, the previously known target outputs associated with the learning inputs are reproduced as well as possible. The machine learning model can in particular include an artificial neural network (ANN), and/or it can be an ANN.

Learning initial states and learning driving maneuvers are provided within the framework of this method. The learning driving maneuvers are carried out on the target vehicle and/or on a simulation model of the target vehicle based on the learning initial states. The time required to carry out the respective learning driving maneuvers is recorded. This period of time is defined as the learning maneuver duration and thus forms the "ground truth" for the training of the dynamics model.

For the actual training, the learning initial states and learning driving maneuvers are fed to the dynamics model and mapped by the dynamics model to a respective maneuver duration. The agreement of the thus obtained maneuver duration with the learning maneuver duration associated with the respective learning initial state and learning driving maneuver is evaluated using a specified cost function. Parameters characterizing the behavior of the dynamics model are optimized with the objective that the further processing of learning initial states and learning driving maneuvers leads to a better evaluation by means of the cost function.

The catalog of all available driving maneuvers is more or less defined in advance. Completely unseen driving maneuvers will not occur in the later driving operation of the target vehicle. On the other hand, many more initial states will occur in the later driving operation than learning initial states were used during training. The power of the dynamics model to generalize can thus be used to predict accurate maneuver durations even for previously unseen initial states.

Further measures improving the disclosure are shown in more detail below, together with the description of the preferred embodiment examples of the disclosure, with reference to the figures.

DETAILED DESCRIPTION

Figure 1:
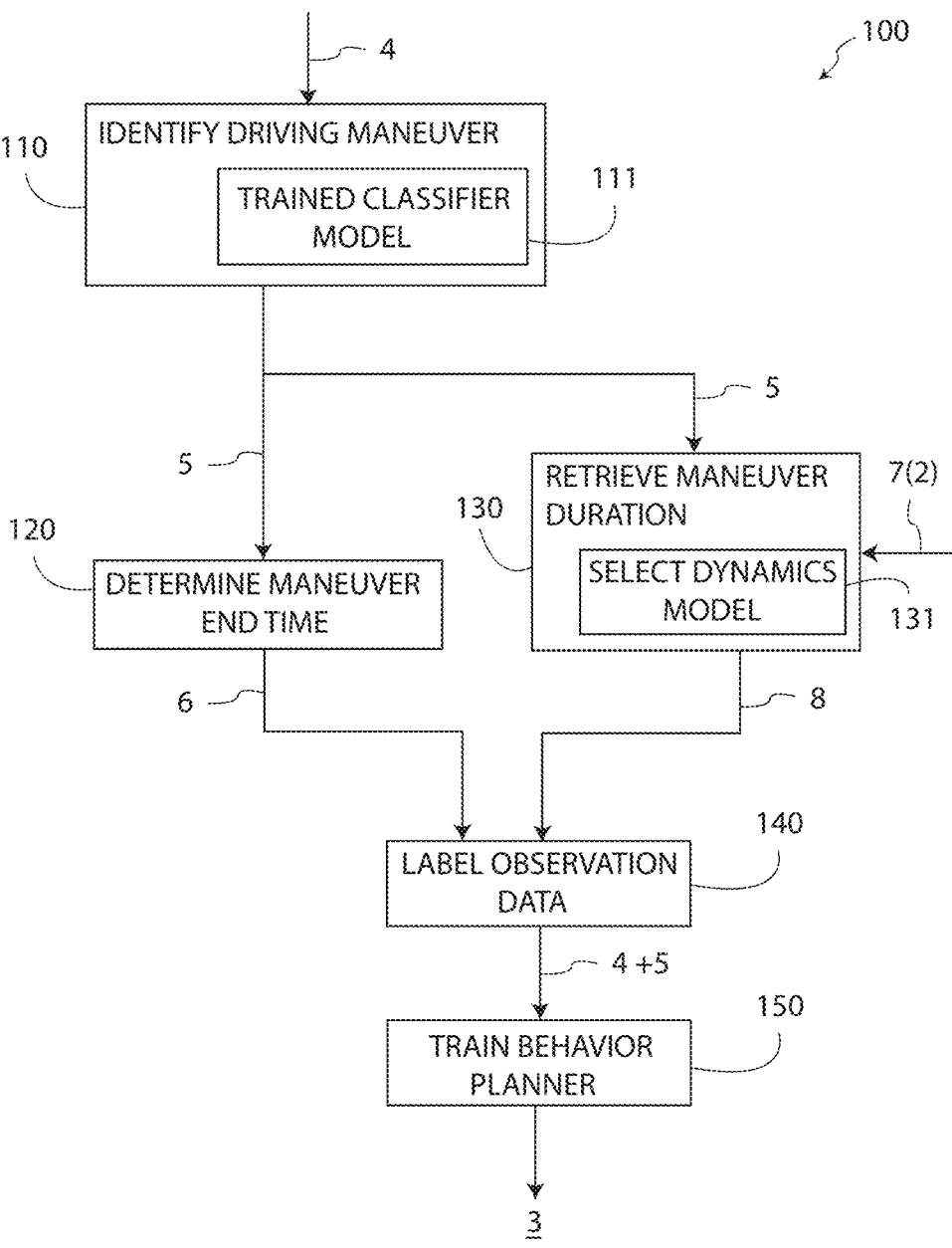
FIG. 1 embodiment example of the method 100 for training a behavior planner 3.

FIG. 1 is a schematic flowchart of an embodiment example of the method 100 for training a behavior planner 3 for an at least partially self-driving target vehicle 2. Observation data 4 relating to the kinematics and/or dynamics that have been recorded during at least one test drive in a test vehicle 1 are used for the training.

In Step 110, at least one driving maneuver 5 that moves the test vehicle 1 from an initial state 5a to an end state 5b is identified from the observation data 4. According to Block 111, the driving maneuver 5, for example, can in particular be identified using a trained classifier model. This classifier model maps a time series of observation data 4 to at least one driving maneuver 5 that is consistent with that time series.

In Step 120, the maneuver end time 6, at which the test vehicle 1 reaches the end state 5b, is determined. In Step 130, a maneuver duration 8 required by the target vehicle 2 to perform the identified driving maneuver 5 is retrieved from a dynamics model 7 of the target vehicle 2. According to Block 131, for example, a dynamics model 7 of the target vehicle 2 can in particular be selected, which is configured to map a combination of an initial state 5a of the target vehicle 2 and a specification of a driving maneuver 5 to a maneuver duration 8.

In Step 140, observation data 4 from a time interval, the end of which is defined by the maneuver end time 6 and the start of which is before the maneuver end time 6 by the maneuver duration 8, are labeled with the identified driving maneuver 5. In Step 150, the behavior planner 3 is trained, using the labeled observation data 4, to map observation data 4 that indicate a state of the target vehicle 2 to at least one driving maneuver 5 to be carried out.

Figure 2:
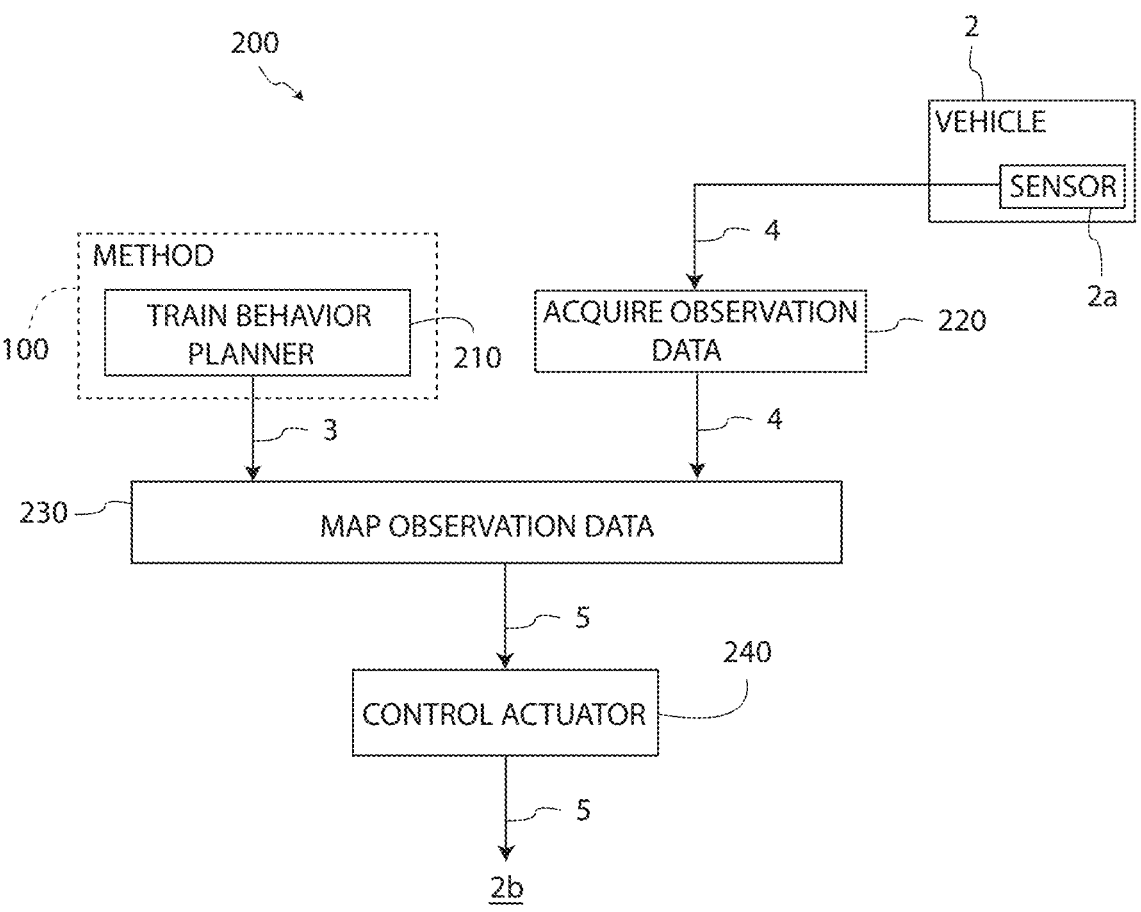
FIG. 2 embodiment example of the method 200 comprising the complete chain of action all the way to the control of the vehicle 2.

FIG. 2 is a schematic flowchart of an embodiment example of the method 200 comprising the complete chain of action all the way to the control of the at least partially self-driving vehicle 2.

In Step 210, a behavior planner 3 for the vehicle 2 is trained using the above-described method (100) according to any one of claims 1 to 5. In Step 220, observation data 4 relating to the kinematics and/or dynamics of the vehicle 2 are acquired by means of at least one sensor 2a of the vehicle 2.

In Step 230, the observation data 4 are mapped by means of the behavior planner 3 to at least one driving maneuver 5 to be carried out and, in Step 240, at least one actuator 2b acting on the driving dynamics of the vehicle 2 is controlled such that the vehicle 2 carries out the driving maneuver 5.

Figure 3:
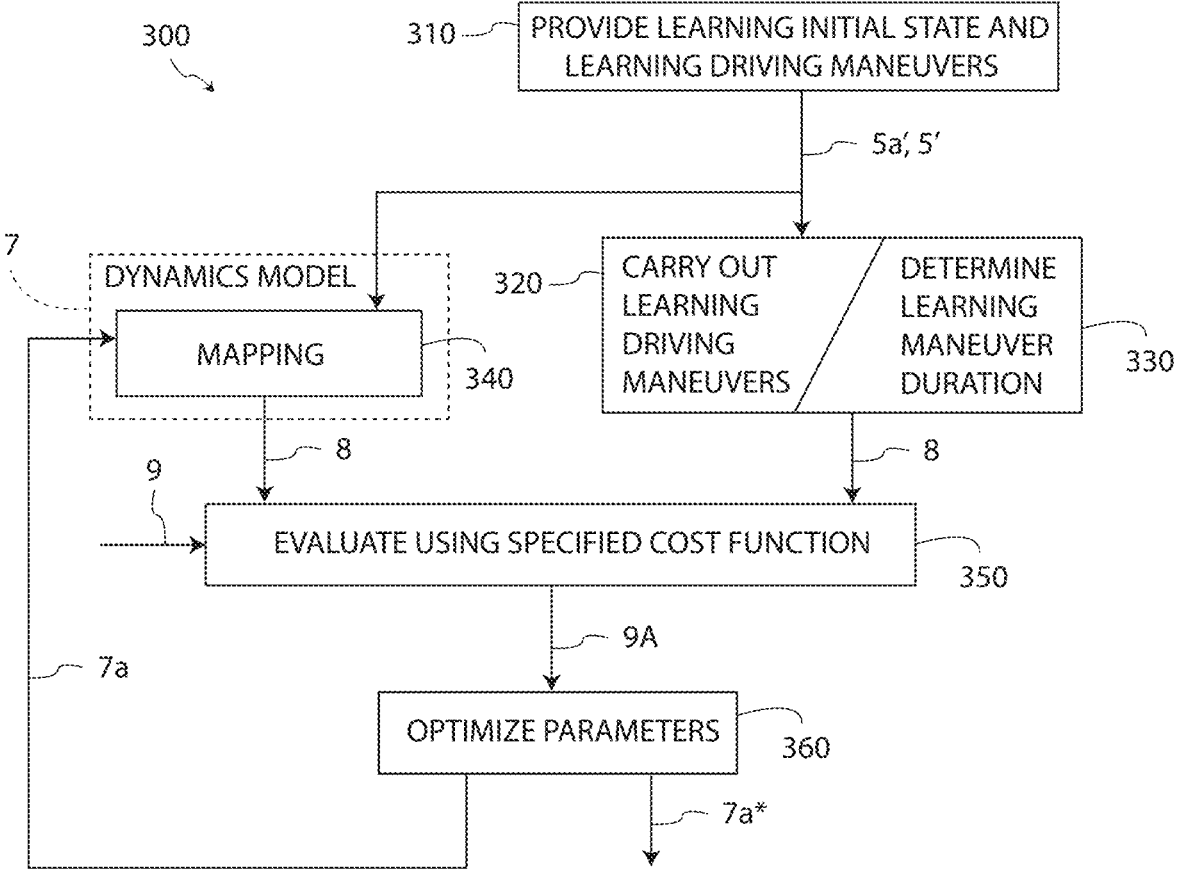
FIG. 3 embodiment example of the method 300 for training a dynamics model 7.

FIG. 3 is a schematic flowchart of an embodiment example of the method 300 for training a dynamics model 7 of a target vehicle 2.

In Step 310, learning initial states 5a' and learning driving maneuvers 5' are provided. In Step 320, based on the learning initial states 5a', the learning driving maneuvers 5' are carried out on the target vehicle 2 and/or on a simulation model of the target vehicle 2. In Step 330, the respective time required to carry out the learning driving maneuvers 5' is determined and defined as the learning maneuver duration 8'.

In Step 340, the learning initial states 5a' and learning driving maneuvers 5' are fed to the dynamics model 7 and mapped by the dynamics model 7 to a respective maneuver duration 8. In Step 350, the agreement of the maneuver duration 8 with the learning maneuver duration 8' associated with the respective learning initial state 5a' and learning driving maneuver 5' is evaluated using a specified cost function 9. In Step 360, the parameters 7a characterizing the behavior of the dynamics model 7 are optimized with the objective that the further processing of learning initial states 5a' and learning driving maneuvers 5' leads to a better evaluation 9a by means of the cost function 9. The fully trained state of the parameters 7a is labeled with the reference sign 7a*.

The invention claimed is:

1. A method, comprising:
training a behavior planner for an at least partially self-driving vehicle by:
identifying at least one driving maneuver that moves a test vehicle from an initial state to an end state from observation data,
determining a maneuver end time at which the test vehicle reaches the end state,
retrieving a maneuver duration required by a target vehicle to carry out the at least one driving maneuver from a dynamics model of the target vehicle, and
labeling the observation data from a time interval, an end of which is defined by the determined maneuver end time and a start of which is before the determined maneuver end time by the retrieved maneuver duration, with the at least one driving maneuver;
acquiring additional observation data relating to kinematics and/or dynamics of the at least partially self-driving vehicle using at least one sensor of the at least partially self-driving vehicle;
mapping the additional observation data, using the trained behavior planner, to the at least one driving maneuver to be carried out by the at least partially self-driving vehicle; and
controlling at least one actuator acting on driving dynamics of the at least partially self-driving vehicle, such that the at least partially self-driving vehicle carries out the at least one driving maneuver.

2. The method according to claim 1, wherein:
the at least one driving maneuver is identified with a trained classifier model; and
the trained classifier model maps a time series of the observation data to the at least one driving maneuver consistent with the time series.

3. The method according to claim 1, wherein the dynamics model is configured to map a combination of the initial state of the at least partially self-driving target vehicle and a specification of the at least one driving maneuver to the retrieved maneuver duration.

4. The method according to claim 3, wherein the combination additionally includes at least one adjustable parameter of the behavior planner of the at least partially self-driving target vehicle.

5. The method according to claim 1, wherein the at least one driving maneuver includes at least one of:

a lane change to an adjacent travel lane;

a change in a driving speed by a specified amount;

stopping the target vehicle at a defined location;

driving behind another vehicle; and emergency braking of the target vehicle.

6. The method according to claim 1, wherein a non-transitory machine-readable data carrier stores a computer program containing machine-readable instructions configured to cause one or more computers to carry out the method.

7. The method according to claim 1, wherein a computer is configured to execute a computer program to perform the method.

\* \* \* \* \*